United States Patent
Knoller

(10) Patent No.: US 10,858,002 B2
(45) Date of Patent: Dec. 8, 2020

(54) SPEED CONTROL SYSTEM FOR CONTROLLING THE SPEED OF A VEHICLE

(71) Applicant: Bayerische Motoren Werke Aktiengesellschaft, Munich (DE)

(72) Inventor: Stefan Knoller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 264 days.

(21) Appl. No.: 16/003,562

(22) Filed: Jun. 8, 2018

(65) Prior Publication Data

US 2018/0290651 A1     Oct. 11, 2018

Related U.S. Application Data

(63) Continuation of application No. PCT/EP2016/079118, filed on Nov. 29, 2016.

(30) Foreign Application Priority Data

Dec. 11, 2015   (DE) .................. 10 2015 225 011

(51) Int. Cl.
   *B60W 30/14*     (2006.01)
   *B60W 30/182*    (2020.01)
   *B60W 30/18*     (2012.01)

(52) U.S. Cl.
   CPC ........ *B60W 30/143* (2013.01); *B60W 30/182* (2013.01); *B60W 2030/1809* (2013.01);
   (Continued)

(58) Field of Classification Search
   CPC ............ B60W 30/143; B60W 30/182; B60W 2030/1809; B60W 2540/10; B60W 2720/106; Y02T 10/76
   See application file for complete search history.

(56) References Cited

U.S. PATENT DOCUMENTS

2009/0150038 A1*  6/2009  Woods .................. B60W 30/16
                                                701/93
2012/0220422 A1   8/2012  Wurthner et al.
(Continued)

FOREIGN PATENT DOCUMENTS

DE    10 2007 056 592 A1   6/2008
DE    10 2009 046 341 A1   5/2011
(Continued)

OTHER PUBLICATIONS

International Search Report (PCT/ISA/210) issued in PCT Application No. PCT/EP2016/079118 dated Feb. 7, 2017 with English translation (six (6) pages).
(Continued)

*Primary Examiner* — Michael D Lang
(74) *Attorney, Agent, or Firm* — Crowell & Moring LLP

(57) ABSTRACT

A speed control system for controlling a speed of a vehicle to a predetermined target speed is provided, wherein in order to achieve and maintain the target speed, a control unit transmits corresponding control signals to a drive unit or a brake unit, and wherein the control unit is configured, during active speed control, to detect the end of a manually triggered temporary acceleration request, to detect the actual speed at the end of a manually triggered temporary acceleration request and to generate a signal to initiate a coasting mode if, after the ending of the manually triggered temporary acceleration request, the actual speed is greater than the predetermined target speed.

8 Claims, 2 Drawing Sheets

(52) U.S. Cl.
CPC ... *B60W 2540/10* (2013.01); *B60W 2720/106* (2013.01); *Y02T 10/60* (2013.01)

(56) References Cited

U.S. PATENT DOCUMENTS

| | | |
|---|---|---|
| 2013/0096792 A1 | 4/2013 | Maier et al. |
| 2014/0067225 A1 | 3/2014 | Lee et al. |
| 2015/0191168 A1 | 7/2015 | Mitsuyasu |

FOREIGN PATENT DOCUMENTS

| | | |
|---|---|---|
| DE | 10 2010 030 346 A1 | 12/2011 |
| DE | 10 2011 050 739 A1 | 12/2012 |
| DE | 10 2012 224 170 A1 | 3/2014 |
| DE | 11 2012 006 619 T5 | 4/2015 |
| DE | 10 2014 002 111 A1 | 8/2015 |
| DE | 10 2015 003 557 A1 | 8/2015 |
| DE | 10 2014 204 763 A1 | 9/2015 |
| EP | 2 738 412 A1 | 6/2014 |
| WO | WO 2015/120872 A1 | 8/2015 |

OTHER PUBLICATIONS

German-language Written Opinion (PCT/ISA/237) PCT Application No. PCT/EP2016/079118 dated Feb. 7, 2017 (six (6) pages).
German-language Search Report issued in counterpart German Application No. 10 2015 225 011.3 dated Jul. 20, 2016 with partial English translation (thirteen (13) pages).
German-language Search Report issued in counterpart German Application No. 10 2015 225 014.8 dated Jul. 28, 2016 with partial English translation (thirteen (13) pages).

\* cited by examiner

SPEED CONTROL SYSTEM FOR CONTROLLING THE SPEED OF A VEHICLE

CROSS REFERENCE TO RELATED APPLICATIONS

This application is a continuation of PCT International Application No. PCT/EP2016/079118, filed Nov. 29, 2016, which claims priority under 35 U.S.C. § 119 from German Patent Application No. 10 2015 225 011.3, filed Dec. 11, 2015, the entire disclosures of which are herein expressly incorporated by reference.

BACKGROUND AND SUMMARY OF THE INVENTION

The invention relates to a speed control system for controlling the speed of a vehicle.

Motor vehicles with speed control systems have been known for a long time. The speed control systems which are usually available nowadays adjust the speed of a motor vehicle to a predefined target speed by a corresponding intervention into the control of the drive or control of the brakes. In addition to these speed control systems, it is also possible nowadays to obtain from some manufacturers a speed control system to which a distance control has been added (referred to as adaptive cruise control (ACC) systems). In terms of the principle involved, the generally known speed control, which maintains a specific predefined target speed, is expanded here with an additional distance control function so that the use of such a distance-related speed control becomes possible even in dense traffic on a freeway or on a country road.

It is also already known that motor vehicles use very little fuel if they sail, i.e., if they use their kinetic energy to roll as far as possible without the drag torque of the engine braking them. This state can be brought about in an automatic vehicle, for example, by engaging the "N" position on the selector lever, and in the case of a manual shift transmission by depressing the clutch or by engaging the idle gear speed. Sailing is used relatively rarely in automatic vehicles, and virtually never in the case of manual shift transmissions. This is the case due to the awkward operator control required to reach the sailing mode.

DE 10 2011 050 739 A1 discloses a method for operating a vehicle in the ACC mode, wherein when a vehicle traveling ahead is detected or approached an operating strategy which is optimum in terms of consumption (e.g., sailing mode, overrun mode or braking mode) for adjusting the target distance is determined and implemented as a function of the speed of the vehicle and of that of the vehicle traveling ahead, the current driving resistance of the vehicle, the distance between the two vehicles and, if appropriate, the acceleration of the vehicle and of the vehicle traveling ahead. Thus, for example, a sailing mode is then activated if it is possible for the vehicle to approach a target distance through the sailing mode without undershooting a permissible minimum distance.

DE 10 2014 204 763 A1 discloses a speed control system, wherein when the speed control system is active and a target speed is reduced manually, the control unit initiates a sailing mode, an overrun mode or a braking mode as a function of the difference between the actual speed and the target speed of the vehicle in order to reach the new target speed.

An object of the present invention is to provide a speed control system which is improved in terms of comfort and consumption, by taking into account the possibility of initiating a sailing mode.

This object is achieved by means of a speed control system as claimed in the independent claim. Advantageous developments can be found in the dependent claims.

The invention is based on a basically known speed control system for controlling the speed of a vehicle to a predefined target speed, wherein the control unit transmits actuation signals, corresponding to the reaching and maintaining of the target speed, to a drive unit or brake unit. The target speed can be predefined here by the driver by an operator control element which is provided, or can be predefined by taking into account acquired information about a maximum permissible top speed (currently applicable or applicable in the near future).

During the speed control for reaching or maintaining the predefined target speed, situations can occur which cause the driver to request a temporary acceleration of the vehicle by depressing the accelerator pedal, that is to say to override the active speed control temporarily. If the driver ends the acceleration request by taking his foot off the accelerator pedal again, the speed control which has been temporarily overridden becomes "active" again, or the speed control assumes control again in order to reach and maintain the predefined target speed. If the current speed is higher than the predefined target speed after the ending of the overriding, the control unit which is responsible for the speed control must bring about deceleration in order to reduce the speed back to the predefined target speed.

The invention is based on the realization that in such a situation when the speed control system is active in order to reach the target speed, it is not absolutely necessary to switch into the overrun mode or even braking mode. It is often sufficient if the deceleration to the target speed occurs by initiating the sailing mode.

Owing to the above considerations, a speed control system for controlling the speed of a vehicle to a predefined target speed is proposed, wherein the control unit transmits actuation signals, corresponding to the reaching and maintaining of the target speed, to a drive unit or braking unit, and wherein the control unit is configured, when the speed control system is active, to detect the ending of a manually triggered temporary acceleration request, to detect the current speed when a manually triggered temporary acceleration request ends, and to generate a signal for bringing about a sailing mode (in order to reach the target speed) if the current speed is higher than the predefined target speed after the manually triggered temporary acceleration request ends.

A sailing mode of the drive unit can be triggered, for example, by virtue of the fact that a signal for initiating a sailing mode is transmitted to the drive unit or that a signal which prevents the sailing mode is canceled, that is to say is no longer output.

"Sailing" of the vehicle can be brought about by disconnecting the active connection between the drive machine and the drive wheels, for example, by automatic activation of the clutch or by automatic engagement of the idle gear speed. Likewise, the engine of the motor vehicle can also be completely switched off in the "sailing mode."

In order to be able to ensure that the sailing mode is brought about only when it is appropriate, in one advantageous refinement the control unit is designed to generate a signal for bringing about a sailing mode (in order to reach the target speed) only if at least one further sailing mode condition is met. In this context, a sailing mode condition can be based on the evaluation of various driver information items and/or vehicle information items and/or surroundings information items which are present. In one particular advantageous refinement of the invention, it has become apparent that at least one sailing mode condition is based on the evaluation of a variable which can detect the deceleration behavior of the vehicle in the sailing mode and/or the desired deceleration behavior and/or the time period for which the sailing mode to be initiated can supposedly be maintained. In other words, the at least one sailing mode condition is configured in such a way that it is considered to be met or not met as a function of the parameters which are present and which are to be evaluated.

It has become apparent that in a situation as defined above a sailing mode is appropriate when it sets a deceleration behavior which is suitable for the driver and/or the traffic situation. In order to be able to take this into account, the control unit can be configured to generate a signal for bringing about a sailing mode (only) if (in the sense of a sailing mode condition) the initiation of the sailing mode brings about a similar deceleration behavior to that without the sailing mode (e.g., overrun mode or braking mode).

In order to be able to determine such a behavior, the control unit can be configured to determine the deceleration which is to be set in the sailing mode and/or the target deceleration in such a situation on the basis of the current speed (and, if appropriate, the predefined target speed).

The control unit can also be configured to generate a signal for bringing about a sailing mode (in order to reach the target speed) if a deceleration, which is determined in the sailing mode on the basis of the current speed and/or the speed difference (between the vehicle traveling ahead and the motor vehicle in question) and/or the target speed and which is supposedly set, lies in a deceleration range which is defined about a target deceleration which is determined on the basis of the current speed and/or the speed difference (between the vehicle traveling ahead and the motor vehicle in question) and/or the target speed. As an alternative to this, the control unit can also be configured to generate a signal for bringing about a sailing mode if a target deceleration, which is determined on the basis of the current and/or the speed difference (between the vehicle traveling ahead and the motor vehicle in question) and/or the target speed, lies in a deceleration range defined about a deceleration, which is determined in the sailing mode on the basis of the current speed and/or the speed difference (between the vehicle traveling ahead and the motor vehicle in question) and/or the target speed.

Both the speed-dependent deceleration in the sailing mode and the speed-dependent target deceleration can be detected in various ways. In the simplest form, the speed-dependent deceleration and/or the speed-dependent target deceleration can be stored in a corresponding characteristic diagram, so that, when necessary, the currently valid, supposedly set speed-dependent deceleration in the sailing mode and/or the speed-dependent target deceleration can be determined therefrom.

The necessary deceleration range can be defined here in such a way that the permitted range is formed in the sailing mode with a permanently predefined or variable offset value in the upward direction and/or downward direction about the target deceleration which is determined on the basis of the current speed when the temporary acceleration request ends or about the deceleration which is determined on the basis of the current speed. The respective offset value in the upward and downward directions can be identical here or else different.

It is also possible to provide that a further or a differently configured sailing mode condition has to be additionally or alternatively met. The control unit can therefore also be configured to generate a signal for bringing about a sailing mode (in order to reach the target speed) only when the initiated sailing mode can be maintained for a predefined time. In other words, the sailing mode should be initiated only when the sailing mode can also be maintained for a certain time period (e.g., approximately 2 seconds).

The invention will now be explained in more detail with reference to the following exemplary embodiment. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
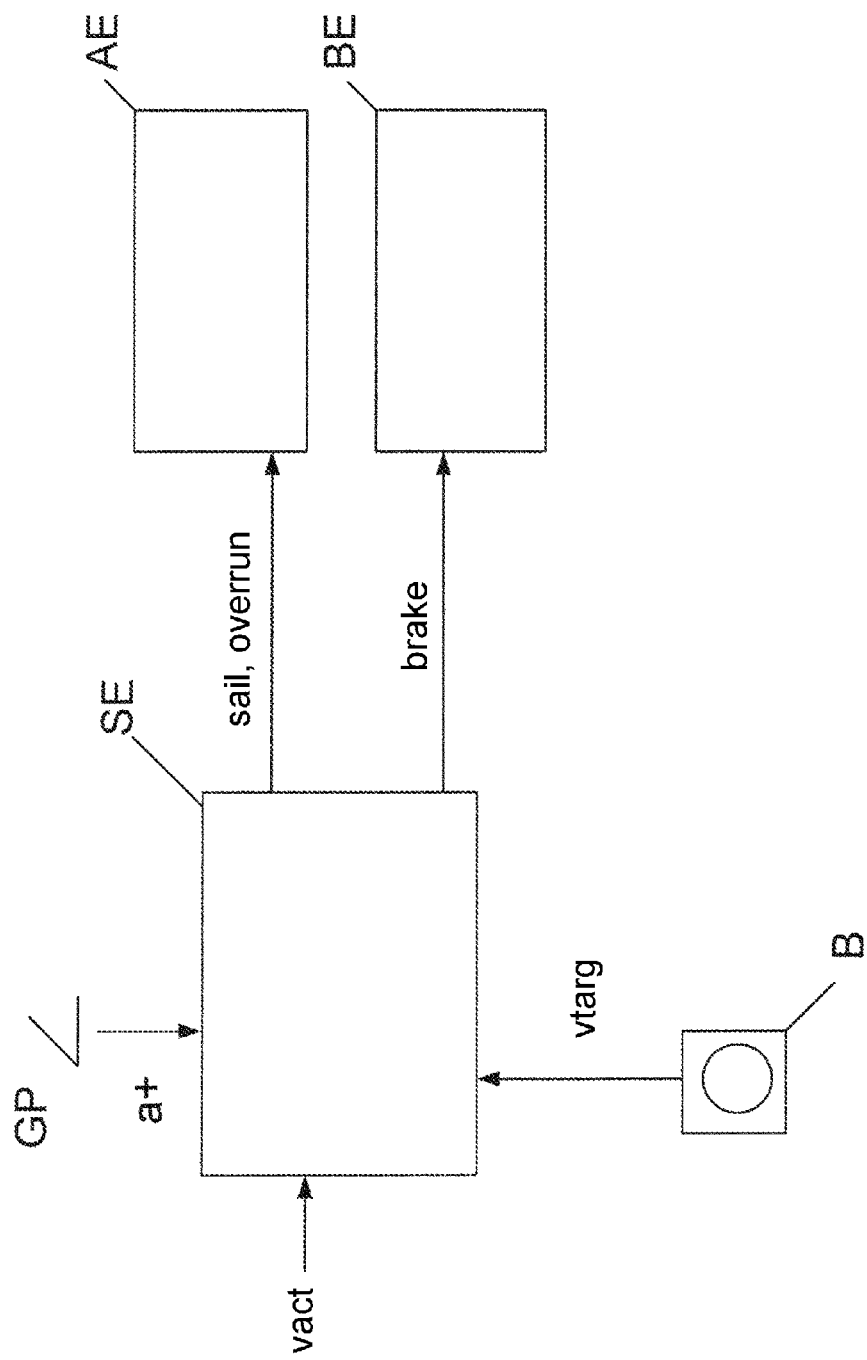
FIG. 1 shows a design of a speed control system.

FIG. 1 shows as a central element of a speed control system in a vehicle for controlling the speed of a motor vehicle from a current speed vact to a predefined target speed vtarg a control unit SE which transmits "sail" or "overrun" actuation signals, corresponding to the reaching and maintaining of a predefined target speed vtarg, to a drive unit AE or a "brake" actuation signal to a brake unit BE. The speed control system also comprises an operator control element B which, when the speed control is active, can be used by the driver to set the target speed vtarg manually. The target speed vtarg, which is requested by the manual activation of the operator control element B, is transmitted to the control unit SE and subsequently the speed control is correspondingly open-loop or closed-loop controlled.

Furthermore, the speed control system is actively coupled in technical terms to an accelerator pedal GP. If the driver activates the accelerator pedal GP when the speed control system is active, the active speed control becomes inactive for the duration of the activation of the accelerator pedal GP, i.e., during this time adjustment to the target speed vtarg which has been set does not take place but instead the acceleration a+ which is requested by the activation of the accelerator pedal GP is implemented.

After the ending of the activation of the acceleration pedal GP and the implementation of the acceleration request a+which is associated therewith, the speed control becomes active again and the control unit SE brings about, through corresponding activation signals to the drive unit AE or the brake unit BE, a return/deceleration to the predefined target speed vtarg.

Figure 2:
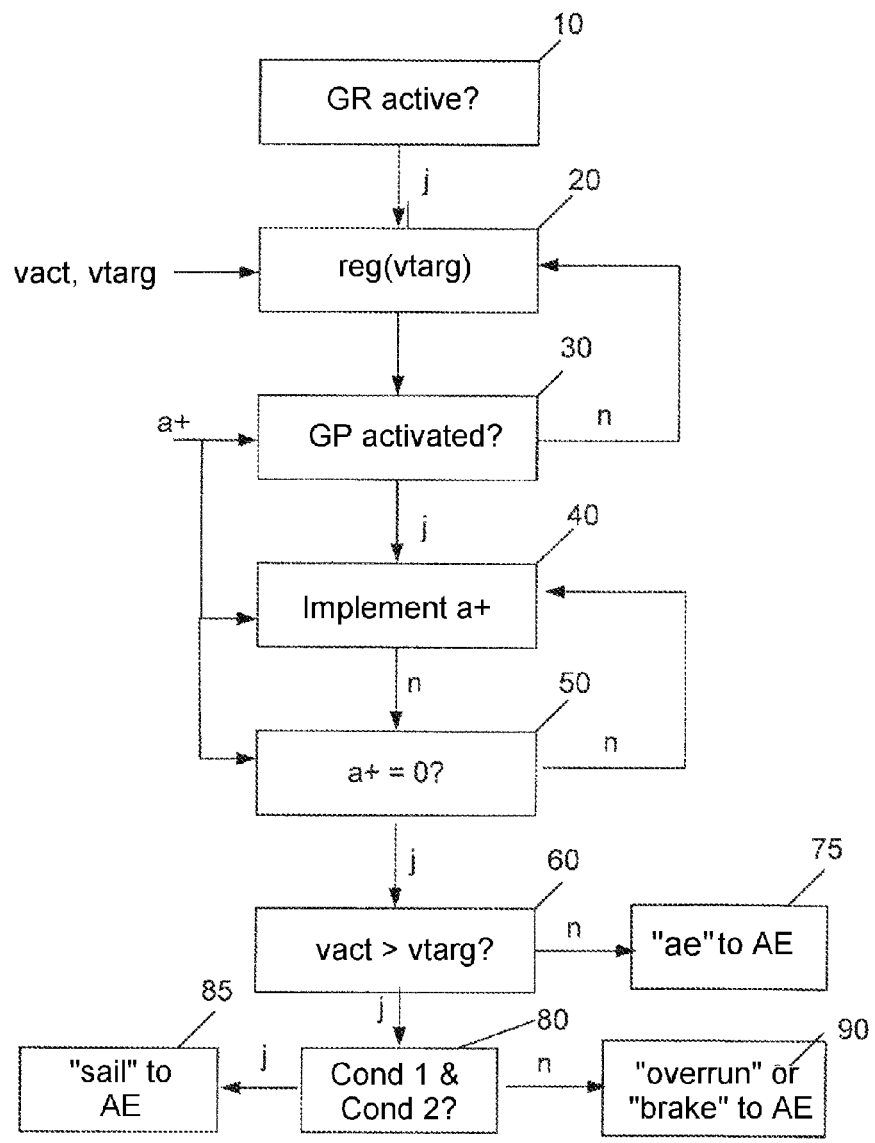
FIG. 2 shows a simplified flow chart illustrating a control process of the speed control which is implemented in the control unit, after the target speed has been temporarily exceeded manually while the speed control is active.

A specific method sequence for bringing about a suitable deceleration to the target speed vtarg after the ending of the activation of the accelerator pedal GP and the implementation of the acceleration request a+ which is associated therewith will now be illustrated on the basis of the following explanations with respect to FIG. 2.

The method starts in step 10 as soon as it is detected that the automatic speed control GR of the vehicle is active. If this is the case, in the next step 20 adjustment is carried out proceeding from the current speed vact to the target speed vtarg which is predefined (by the driver).

During this speed control reg(vtarg), it is continuously monitored whether the accelerator pedal GP is activated (step 30). As long as no activation of the accelerator pedal GP is detected, the speed control is maintained.

However, if activation of the accelerator pedal GP and therefore a manually triggered temporary acceleration request a+ is detected in step 30, the system jumps to step 40 and the speed control is temporarily deactivated in that adjustment no longer takes place to the predefined target speed vtarg but instead the acceleration a+ which is requested manually by the driver is implemented.

The manual acceleration request a+ is implemented until ending of the manually triggered temporary acceleration request is detected, that is to say when the accelerator pedal is no longer activated (a+=0). If this state is detected in step 50, in the next step 60 it is interrogated whether the current speed vact is higher than the predefined target speed vtarg. If this is not the case, the control unit brings about a signal AE to the drive unit AE to accelerate the vehicle to the predefined target speed vtarg (step 75).

However, if an actual speed vact which is higher than the predefined target speed vtarg is detected when the manually triggered temporary acceleration request ends, the system proceeds to step 80. In step 80 it is interrogated whether a similar deceleration behavior would be achieved in accordance with a first sailing mode condition (Cond1) by initiating the sailing mode than without the sailing mode, and whether in accordance with a second sailing mode condition (Cond2) the sailing mode could be maintained for at least a predefined time interval (e.g., 2 seconds) in the case of unchanged conditions. If both conditions are met, the initiation of the "sail" sailing mode is brought about in order to decelerate the vehicle in order to reach the target speed vtarg (step 85). Otherwise, either the initiation of an overrun mode "overrun" or the initiation of a braking mode "brake" is brought about as a function of further conditions (step 90), in order in this way to be able, if appropriate, to reach the predefined target speed vtarg more quickly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A speed control system for controlling a speed of a vehicle to a predefined target speed, wherein a control unit transmits actuation signals, corresponding to reaching and maintaining of the target speed, to a drive unit or a brake unit, wherein, when the speed control system is active, the control unit is configured to:
   detect an ending of a manually triggered temporary acceleration request;
   detect a current speed when the manually triggered temporary acceleration request ends; and generate a signal for bringing about a sailing mode when the current speed is higher than the predefined target speed after the manually triggered temporary acceleration request ends;
   wherein the control unit is configured to generate a signal for bringing about the sailing mode when a sailing mode condition is met; and
   wherein the sailing mode condition is based on an evaluation of a variable which can detect a time period for which the sailing mode to be initiated can be maintained and is based on at least one of a deceleration behavior of the vehicle in the sailing mode and a desired deceleration behavior.

2. The speed control system as claimed in claim 1, wherein the control unit is configured to generate a signal for bringing about the sailing mode when initiation of the sailing mode brings about a similar deceleration behavior to that without the sailing mode.

3. The speed control system as claimed in claim 1, wherein the control unit is configured to generate a signal for bringing about the sailing mode when a deceleration which is determined in the sailing mode based on at least one of the current speed, a speed difference, and the target speed lies in a deceleration range which is defined about a target deceleration which is determined based on at least one of the current speed, the speed difference, and the target speed.

4. The speed control system as claimed in claim 1, wherein the control unit is configured to generate a signal for bringing about the sailing mode when a target deceleration which is determined based on at least one of the current speed, a speed difference, and the target speed lies in a deceleration range which is defined about a deceleration which is determined in the sailing mode based on the current speed, the speed difference, and the target speed.

5. The speed control system as claimed in claim 1, wherein the control unit is configured to generate a signal for bringing about the sailing mode when the sailing mode can be maintained for a predefined time.

6. A method for controlling a speed of a vehicle to a predefined target speed, wherein a control unit transmits actuation signals, corresponding to reaching and maintaining of the predefined target speed, to a drive unit or a brake unit, wherein, when the speed control system is active, the method comprising:
   detecting an ending of a manually triggered temporary acceleration request;
   detecting a current speed when the manually triggered temporary acceleration request ends; and
   generating a signal for bringing about a sailing mode when the current speed is higher than the predefined target speed after the manually triggered temporary acceleration request ends;
   wherein the control unit is configured to generate a signal for bringing about the sailing mode when a sailing mode condition is met; and
   wherein the sailing mode condition is based on an evaluation of a variable which can detect a time period for which the sailing mode to be initiated can be maintained and is based on at least one of a deceleration behavior of the vehicle in the sailing mode and a desired deceleration behavior.

7. The method as claimed in claim 6, wherein the control unit is configured to generate a signal for bringing about the sailing mode when initiation of the sailing mode brings about a similar deceleration behavior to that without the sailing mode.

8. The method as claimed in claim 6, wherein the control unit is configured to generate a signal for bringing about the sailing mode when a deceleration which is determined in the sailing mode based on at least one of the current speed, a speed difference, and the target speed lies in a deceleration range which is defined about a target deceleration which is determined based on at least one of the current speed, the speed difference, and the target speed.

* * * * *